United States Patent [19]

Antoniello et al.

[11] Patent Number: 5,193,582

[45] Date of Patent: Mar. 16, 1993

[54] WATER DIVERTER VALVE

[76] Inventors: Frank Antoniello, 17 Wenmore Dr., Commack, N.Y. 11725; Jerome Warshawsky, 1322 Everit Pl., Hewlett Harbor, N.Y. 11557

[21] Appl. No.: 770,906

[22] Filed: Oct. 4, 1991

[51] Int. Cl.⁵ .................................... F16K 11/074
[52] U.S. Cl. .......................... 137/625.14; 137/625.15; 251/175
[58] Field of Search ............. 137/597, 625.15, 625.14; 251/304, 314, 175

[56] References Cited

U.S. PATENT DOCUMENTS

| | | | |
|---|---|---|---|
| 2,209,136 | 7/1940 | Parker | 251/175 X |
| 2,908,293 | 10/1959 | Johnson | 137/597 X |
| 3,026,899 | 3/1962 | Mischanski | 251/304 X |
| 4,997,007 | 3/1991 | Niemann et al. | 137/597 X |

Primary Examiner—Stephen M. Hepperle

[57] ABSTRACT

A diverter valve for use for domestic household water use which may be operated at a minimal use of manual forces disclosed. The diverter valve generally includes a plurality of water inlet sources opening to an inner chamber. Said inner chamber having a plurality of outlet sources at the base of said chamber, a sealing means communicating with said outlet sources for alternately turning on or off the flow of water from said inlet sources through said outlet sources. The sealing means is urged against the base of said mixing chamber by means of a spring, as well as by the pressure of water from said inlet sources above said sealing means. The sealing means is rotatable as the result of rotation of a spindle. In the preferred embodiment an O-ring is provided to further seal the water away from the inlet source and the outlet source.

7 Claims, 12 Drawing Sheets

Fig.5
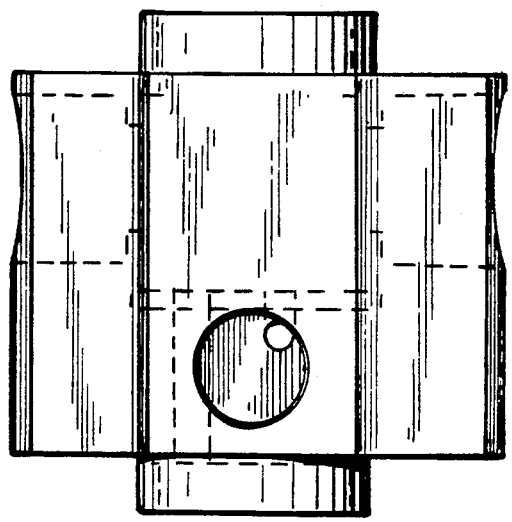
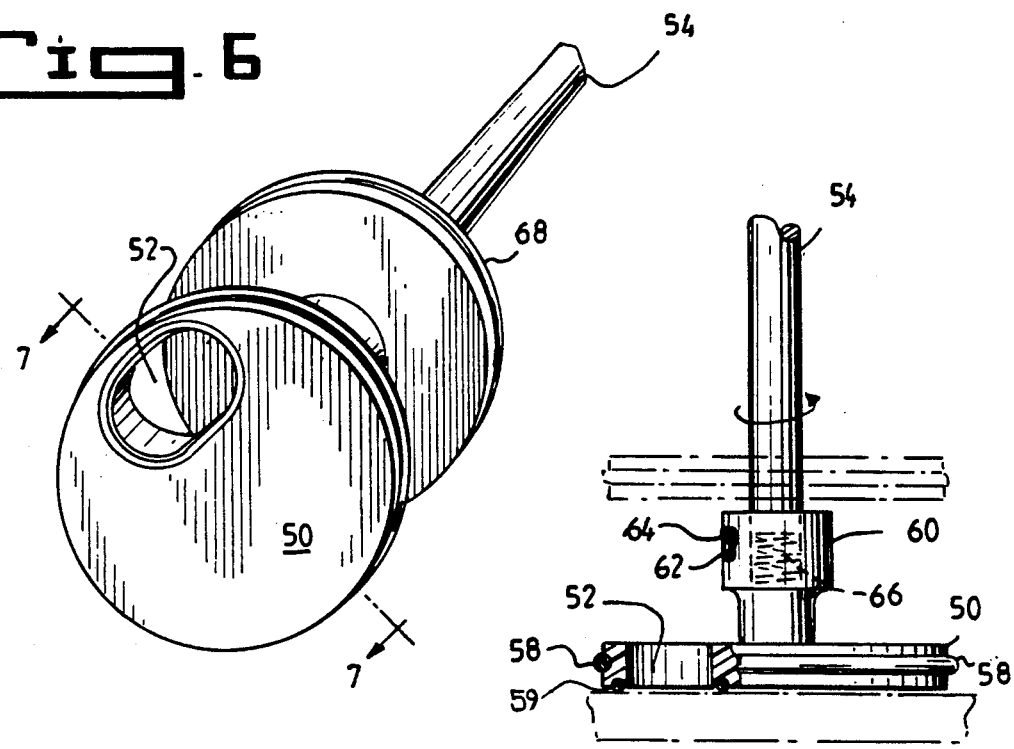
Fig.6
Fig.7

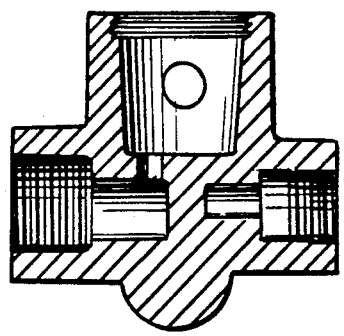
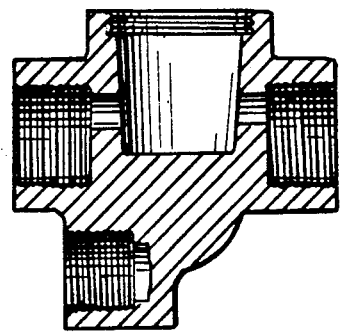
Fig.15B    Fig.15C
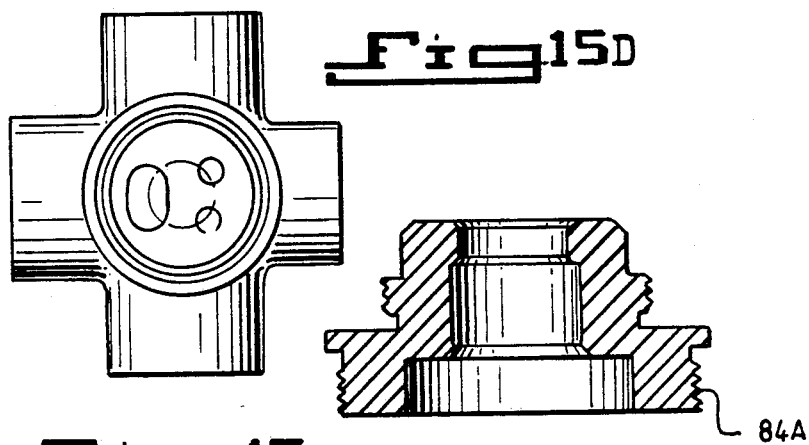
Fig.15D
Fig.16
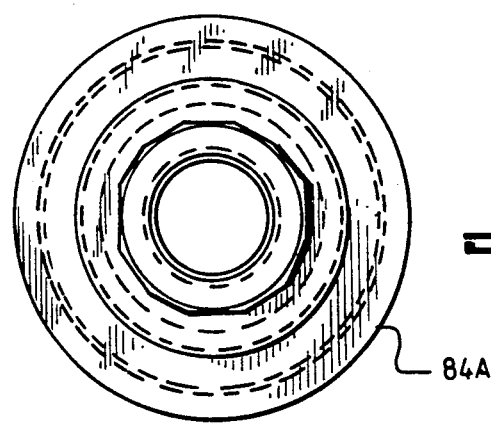
Fig.16A Fig. 20
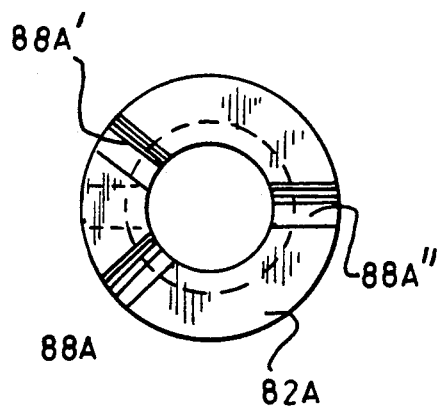
Fig. 20 A
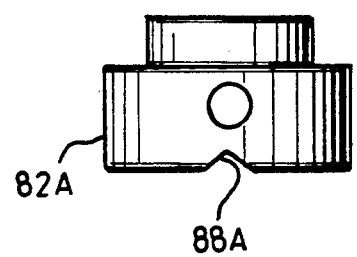
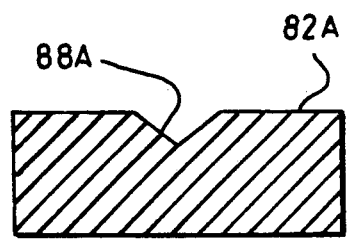
Fig. 20 B
Fig. 21A
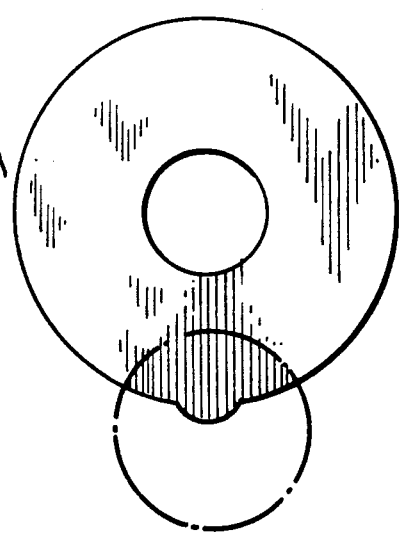
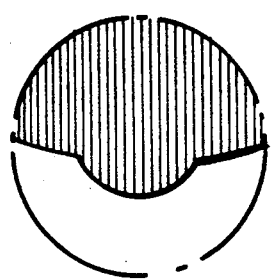
Fig. 21 B

WATER DIVERTER VALVE

The present invention relates to a diverter valve for a plurality of water pipes, and more particularly for a valve establishing alternate communication between hot and cold water inlets and a plurality of output modes.

BACKGROUND OF THE INVENTION

Various diverter valves are known in the art. One of said diverters, identified by a Grohe diverter valve, includes a housing that has two inlets for hot and cold water respectively and a plurality of outlets communicating with the two inlet pipes by means of a cylindrical rotating seal means having alternate holes for communicating with the various outlet pipes of the diverter valve. In this invention, a generally cylindrical seal is rotated around a vertical axis. The vertically rising surface of the cylindrical seal means contains outlet holes for communicating the water from the inlet pipes with the outlet pipes. In this mechanism, the incoming water does not affect the position of the vertically rising cylindrical seal.

In a further example of the existing art, a valve is provided by Boccini with a cylindrically rotating valve activated by a vertically movable piston.

In both of these versions, the application of a great deal of force is required for a complete seal and the seal acts against the movement of the water. It is to be understood that it is desirable to eliminate the above listed disadvantages.

SUMMARY OF THE INVENTION

Accordingly, it is an object of the present invention to provide a diverter valve for communicating a plurality of inlet water sources to a plurality of outlet sources, which avoids the disadvantages of the prior art.

It is a further object of the invention to provide a diverter valve which utilizes the water pressure to further close the seal between the inlet water source and the outlet water source.

It is a further object of the invention to provide a seal which minimizes the potential problems of a backwash of water due to an interruption in the water supply.

In keeping with these objects and with others which will become apparent hereinafter, one feature of the present invention resides, briefly stated, in a water diverter valve of the above mentioned type provided with a seal and a housing wherein the seal is held in place by the force of water from the inlet sources. A spring mechanism is further provided to hold the seal in place in case of an interruption of flow causing a backwash of water from the outlet to the inlet.

In accordance with another advantageous feature of the present invention, the seal has a horizontally oriented surface which can be brought in tight contact with the plurality of outlet sources and can interrupt the communication between the existing inlet water sources and the outlet sources.

The novel features of the present invention are set forth in the appending claims. The invention itself, however, would best be understood from the following description of a preferred embodiment which is accompanied by the following drawings.

BRIEF DESCRIPTION OF THE DRAWINGS

FIG. 1A is a bottom perspective view of the device in accordance with the present invention.

FIG. 5 is a side view of the device as shown in FIG. 1.

FIG. 6 is a close-up perspective view of the seal member.

FIG. 7 is a side view of the seal member portion of the device as shown in FIG. 6, shown in partial section.

FIGS. 16-16A show the bonnet of FIG. 11 in side sectional and top views.

FIG. 20, 20A AND 20B are side sectional and side elevational views of the detent as shown in FIG. 11.

FIGS. 21A AND 22B are close-up views of the detent plate as shown in FIG. 11, with FIG. 21B being a close-up of a portion of the detent plate shown in FIG. 21A.

DESCRIPTION OF THE PREFERRED EMBODIMENT

Figure 1:
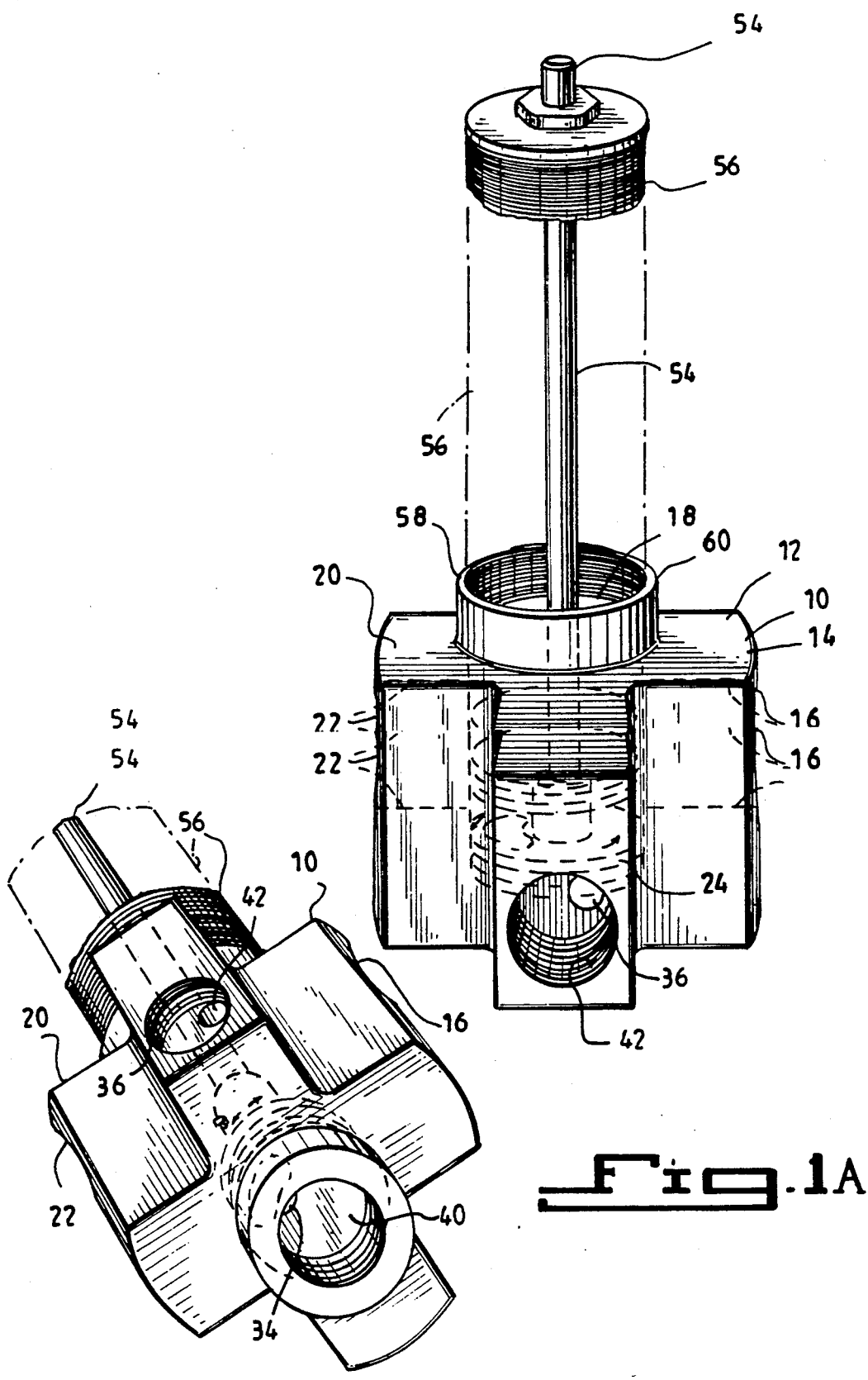
FIG. 1 is a perspective view of the device in accordance with the present invention.
Figure 2:
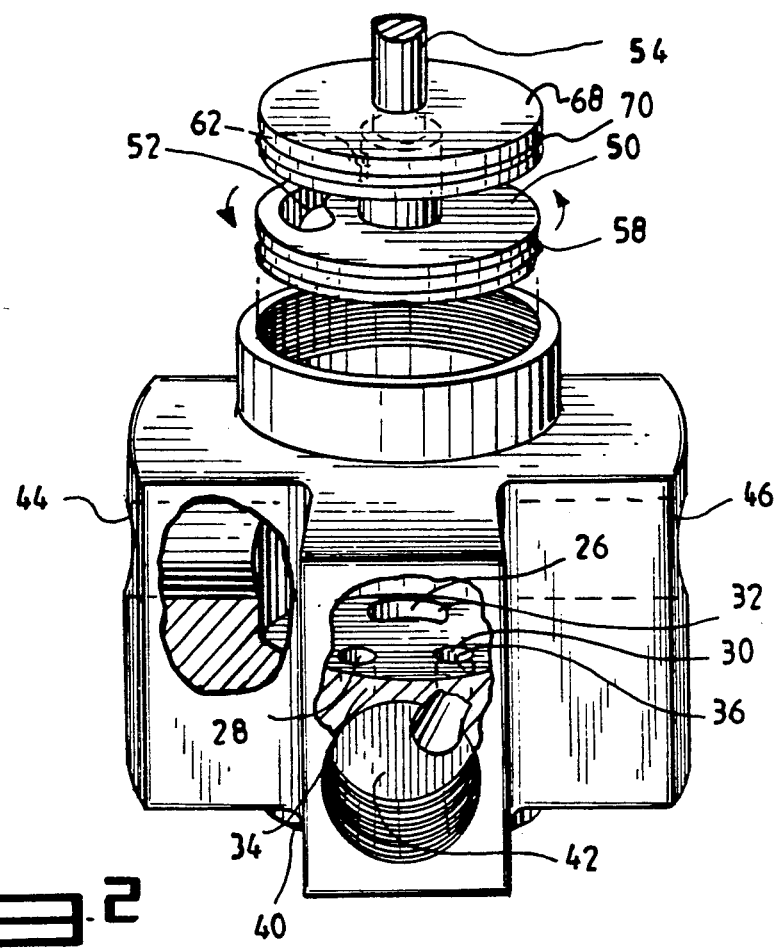
FIG. 2 is a perspective view of the device in accordance with the present invention, with the seal member shown in an exploded view.
Figure 2A:
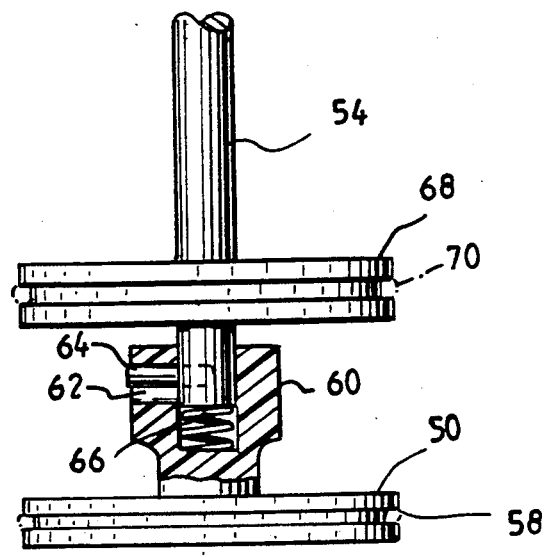
FIG. 2A is a close-up side view of the seal member of the device, shown in partial cross section.
Figure 3:
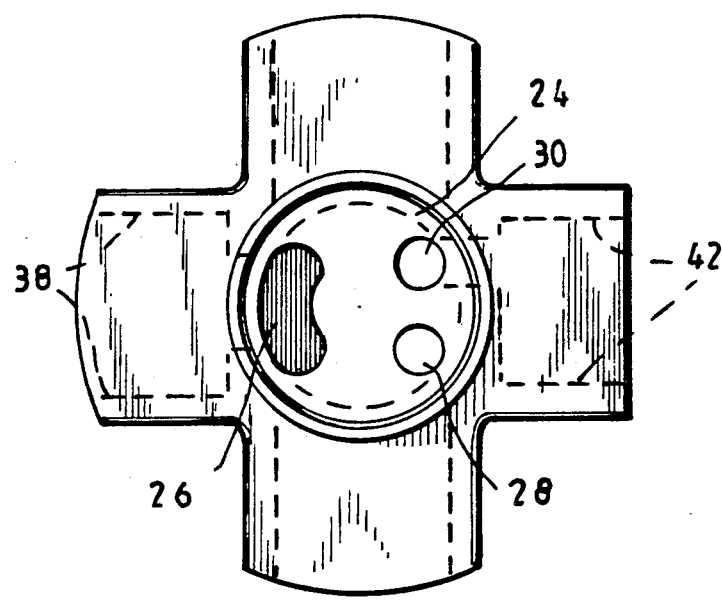
FIG. 3 is a top view of the housing portion of the device as shown in FIG. 1.
Figure 4:
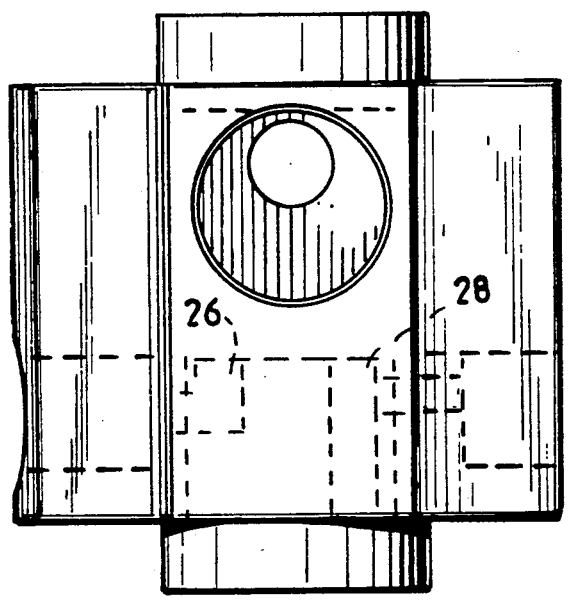
FIG. 4 is a front view of the device as shown in FIG. 1.
Figure 8:
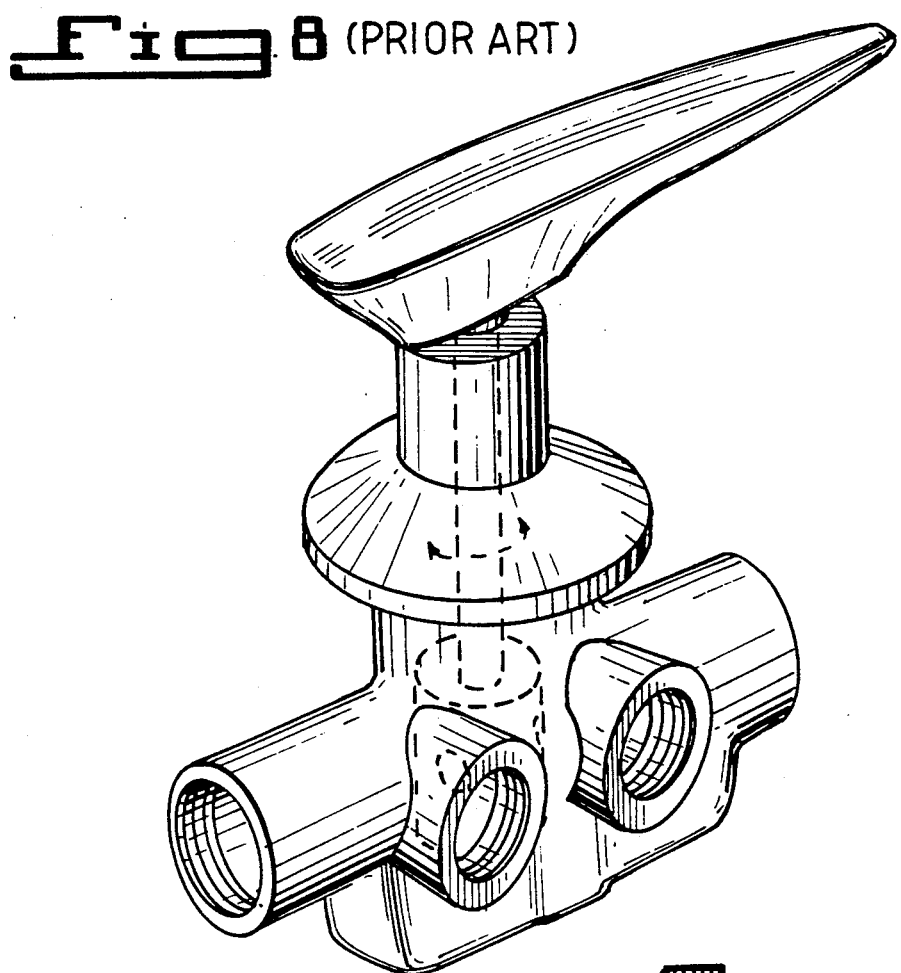
FIG. 8 is an example of the prior art.
Figure 9:
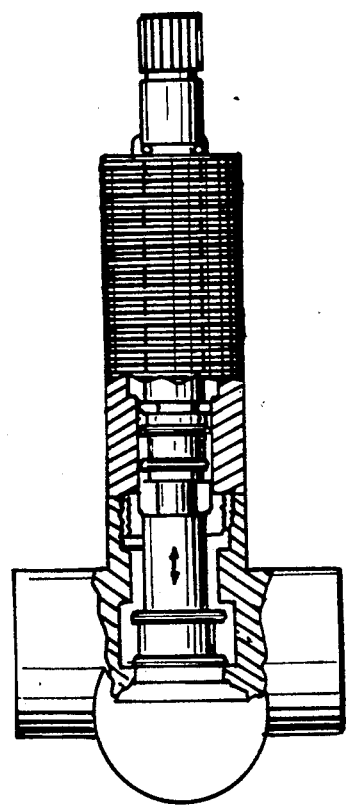
FIG. 9 is an example of the prior art.
Figure 10:
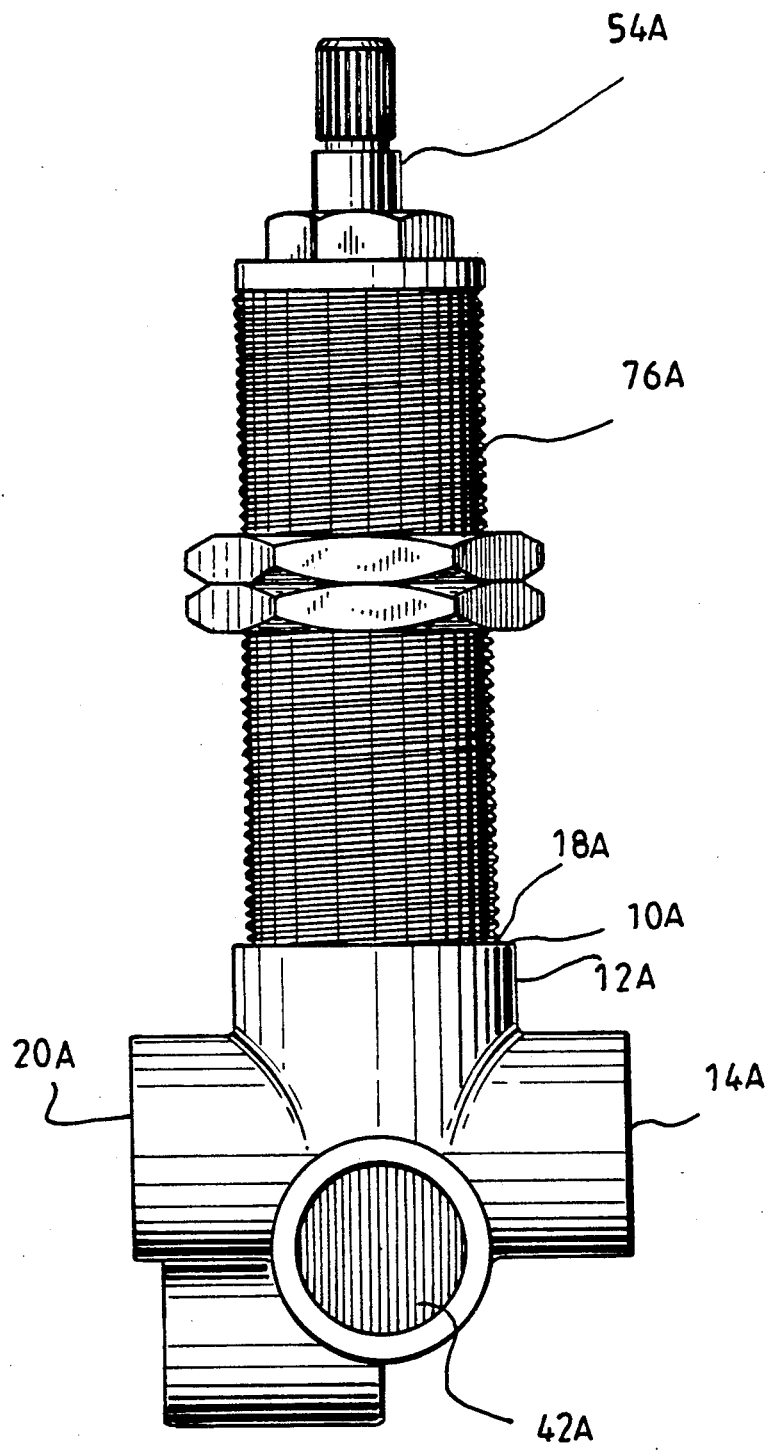
FIG. 10 is a side elevational view of another embodiment of the device.

As shown in FIGS. 1-5, the diverter valve 10 includes a housing portion 12, which has a cold water inlet assembly 14 enclosing inlet conduit 16 and inlet port 46, the assembly communicating with inner chamber 18 of housing 10, and a further hot water inlet assembly 20 enclosing an inlet conduit 22 and inlet port 44, the further hot water assembly also communicating with inner chamber 18. Inner mixing chamber 18 includes chamber base member 24 having a plurality of outlet holes 26, 28 and 30, which holes are located within mixing chamber 18 at the bottom of said mixing chamber 18. Outlet holes 26, 28 and 30 of chamber base 24 further communicate with the plurality of connecting tubes 32, 34 and 36 communicating with outlet conduits 38, 40 and 42 respectively.

It is noted that outlet hole 26 communicating with outlet tube 32 and further outlet conduit 38 is generally larger than outlet holes 28 and 30 leading to outlet tubes 34 and 36 and outlet conduits 40 and 42 respectively. This is because the outlet assembly which is made of outlet hole 26 within chamber base 24, (said outlet hole 26 communicating with intermediate outlet tube 32 and outlet conduit 38), requires a larger dimension to accommodate a larger flow of water to fill a bathtub. On the contrary, however, outlet holes 28 and 30 communicating respectively with intermediate outlet tubes 34 and 36 together with outlet conduits 40 and 42 respectively, require smaller dimensions to permit a slower flow of water for a shower or a hand shower. It is to be noted that the device may be made with only two outlet holes, namely, the larger outlet hole 26 and one smaller outlet hole 28 to accommodate shower and bathtub fixtures which do not have a third source of water for a hand shower, but rather only one large source of water for a bathtub and a smaller source of water for a shower.

It is to be noted that the outlet assemblies designated by reference numerals 26, 32 and 38; 28, 34, 40 and 30, 36, 42 are located within diverter chamber 18 at a point below where hot water inlet 44 and cold water inlet 46 enter chamber 18. The purpose of locating the outlet holes below where the hot and cold water inlets 44 and 46 enter chamber 18, is to permit a significant flow of water from hot water inlet 44, cold water inlet 46, or a combination of both hot water inlet 44 and cold water inlet 46 at a position above said outlet holes 26, 28 and 30 within chamber base 24, so that horizontal seal means 50, communicating with holes 26, 28 and 30 of chamber base 24, is further held down by the downward pressure of water flowing above seal member 50, generally horizontal in orientation. Seal member 50 contains outlet hole 52 for communicating with outlet holes 26, 28 or 30 depending on the position of said hole 52 upon rotation of sealing means 50 about the vertical axis by rotation of spindle member 54 within spindle housing 56. Outlet hole 52 contains circumferential O-ring 59 to make a water tight fit when outlet hole 52 is not engageable with outlet holes 26, 28 and 30 of chamber base 24. Since seal member 50 is generally a disk shaped flat seal means, having edge O-ring 58, it can be held in place snuggly against chamber base 24 and rotated about the vertical axis by means of rotation of spindle member 54 integrally connected to the horizontally rotating seal means 50. Because of the pressure of water above seal means 50 from inlet ports 44 and 46, the seal member 50 is held down in place by virtue of the water pressure above it.

It is noted also as shown in FIG. 7 holding member 60 of seal member 50 is indented with groove 62 within which pin 64 is movable relative to same. Pin 64 stops the downward movement of spindle holding member 60, having internal wound spring means 66 to keep further constant pressure of seal member 50 against chamber base 24. The spring is compressed below a sealing flange 68 above the spindle holding member 60. This is necessary to prevent a backwash of water from the outlet if there is an interruption of water source. The pin acts to hold the seal in place against the further interruptions of water which may cause the interruption of the sealing function of seal 50 against chamber base 24.

To complete the enclosure of water within chamber 18, upper sealing flange 68, encircled by O-ring 70, seals off the top of chamber 18 in a water tight manner.

Valve spindle 54 rotates about a vertical axis within further housing member 76, which housing member 76 is connected to the upper portion 78 of chamber housing 10 having inner chamber 18 within which inlet water mixes above and against seal member 50 and through seal hole port 52, and thereafter through either outlet port holes 26, 28 or 30 within chamber base 24. The outlet holes 26, 28 and 30 further communicate respectively with outlet tubes 32, 34 and 36 and outlet conduits 38, 40 and 42 for dispersal of water in a plurality of modes to either a bathtub, a shower or a hand shower.

In summary, the diverter valve operates in the following manner. The horizontally oriented disk shaped seal 50 is placed snug against chamber base 24 and is rotated horizontally about a vertical axis by means of rotation of spindle connecting member 60 and spindle member 54. When it is necessary to interrupt the flow of water, the spindle 54 is rotated so that the hole 52 of sealing member 50 is rotated away from communicating from either of outlet port holes 26, 28 and 30 of chamber base 24 so as to seal off the flow of water communicating therebetween. As a result, the sealing member 50 firmly abuts against the upper surface of chamber base 24 in a water tight manner.

In another embodiment, as shown in FIG. 10–21, the diverter valve 10A includes a housing portion 12A, which has a cold water inlet assembly 14A, the assembly communicating with inner chamber 18A of housing 10A, and a further hot water inlet assembly 20A also communicating with inner chamber 18A. Inner mixing chamber 18A includes chamber base member 24A having a plurality of similar outlet holes 26A, 28A and 30A, which holes are located within mixing chamber 18A at the bottom of said mixing chamber 18A. Outlet holes 26A, 28A and 30A of chamber base 24A further communicate with the plurality of connecting tubes 32A, 34A and 36A communicating with outlet conduits 38A, 40A and 42A respectively. However, in this embodiment designated as reference numeral 10A, third outlet conduit 42A exits horizontally instead of vertically down as outlet 42 does in the embodiment shown in FIGS. 1–7.

Similar to the embodiment shown in FIGS. 1–7, the embodiment shown in FIGS. 10–21 has outlet assemblies designated by reference numerals 26A, 32A and 38A; 28A, 34A, 40A and 30A, 36A, 42A are located within diverter chamber 18A at a point below where hot water inlet 44A and cold water inlet 46A enter chamber 18A. The purpose of locating the outlet holes below where the hot and cold water inlets 44A and 46A enter chamber 18A, is to also permit a significant flow of water from hot water inlet 44A, cold water inlet 46A, or a combination of both hot water inlet 44A and cold water inlet 46A at a position above said outlet holes 26A, 28A and 30A within chamber base 24A, so that horizontal seal means 50A, communicating with holes 26A, 28A and 30A of chamber base 24A, is further held down by the downward pressure of water flowing above seal member 50A, generally horizontal in orientation. Seal member 50A also contains outlet hole 52A for communicating with outlet holes 26A, 28A or 30A depending on the position of said hole 52A upon rotation of sealing means 50A about the vertical axis by rotation of spindle member 54A within spindle housing 76A. Since seal member 50A is generally a disked shape flat seal means, having edge O-ring 58A, it can also be held in place snuggly against chamber base 24A and rotated about the vertical axis by means of rotation of spindle member 54A integrally connected to the horizontally rotating seal means 50A. Because of the pressure of water above seal means 50A the seal member 50A is also held down in place by virtue of the water pressure above it.

Figure 11:
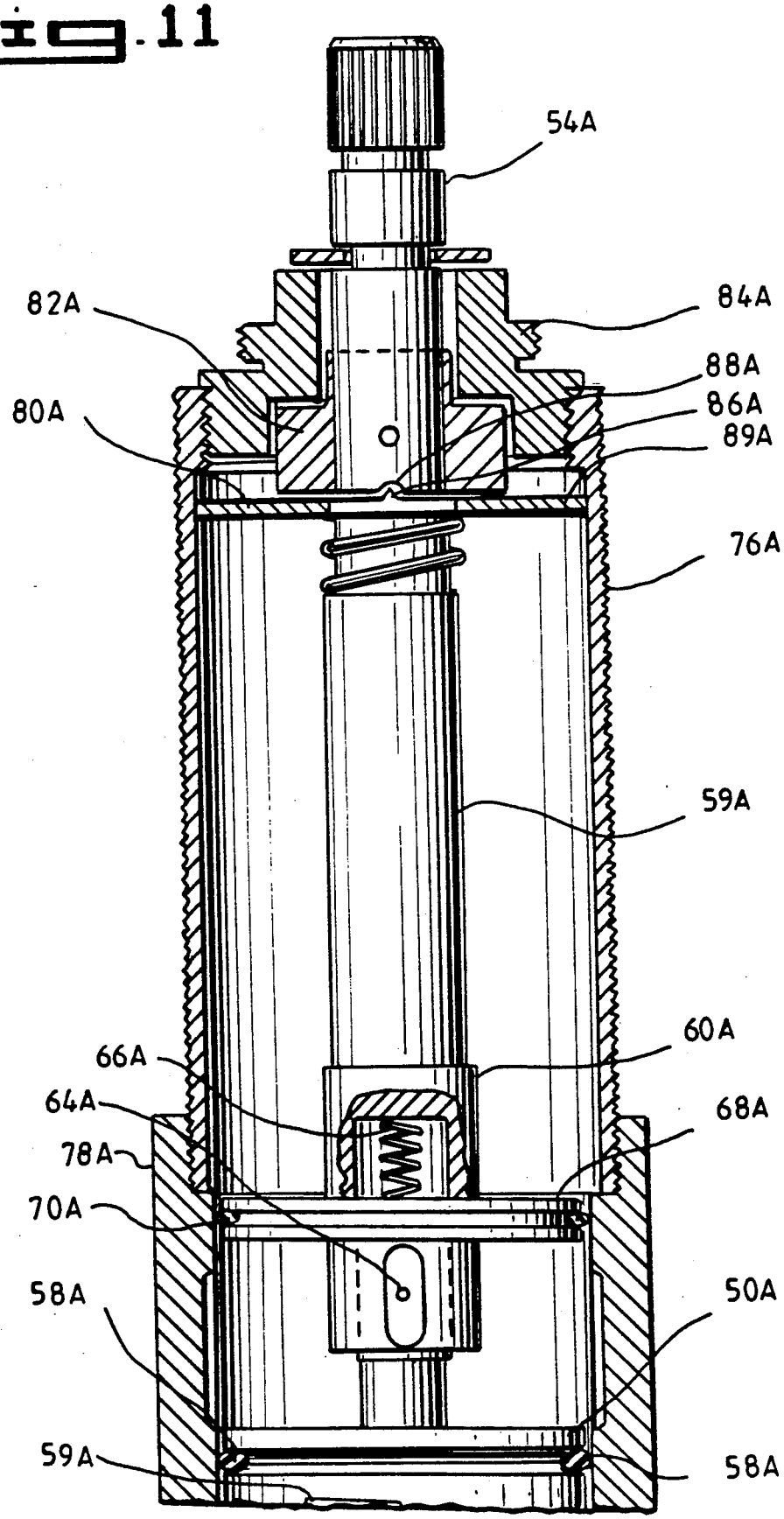
FIG. 11 is a side sectional view of the device as shown in FIG. 10.
Figure 12:
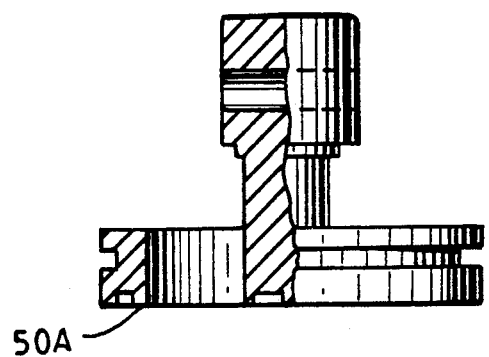
FIG. 12 is a close-up side view of the floating seat as shown in FIG. 11.
Figure 13:
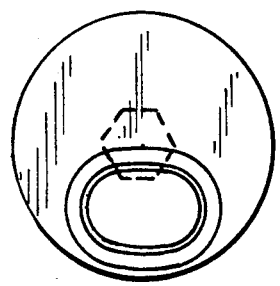
FIG. 13 is a close-up top view of the floating seat as shown in FIG. 11.
Figure 14:
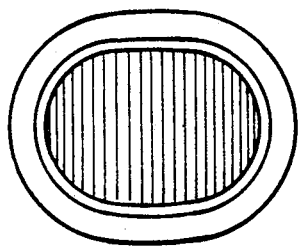
FIG. 14 is a close-up top view of the outlet port within the floating seat as shown in FIG. 13.
Figure 15:
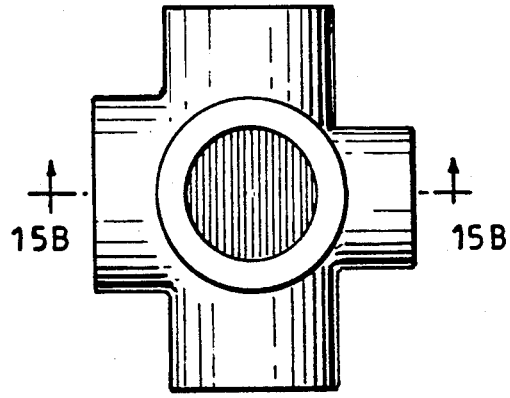
FIGS. 15-15C, depict views of the housing as shown in FIG. 11.
Figure 15A:
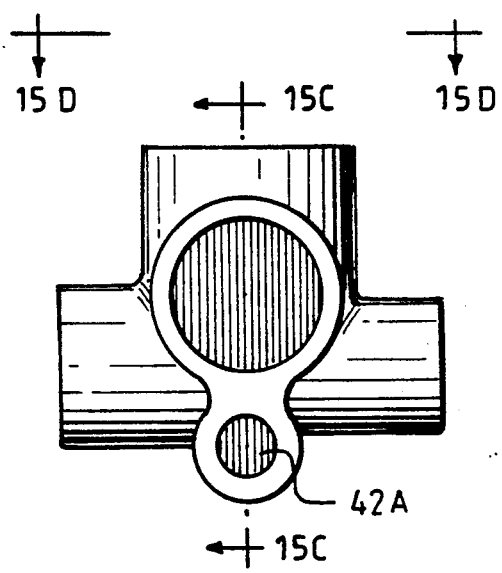
Figure 17:
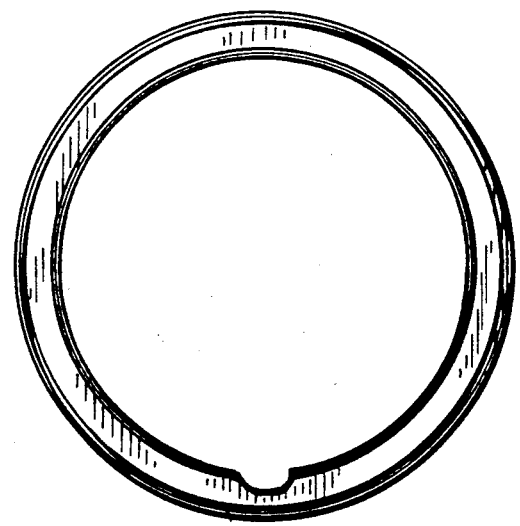
FIGS. 17 and 17A are close-up top and side sectional views of the housing as shown in FIG. 11.
Figure 17A:
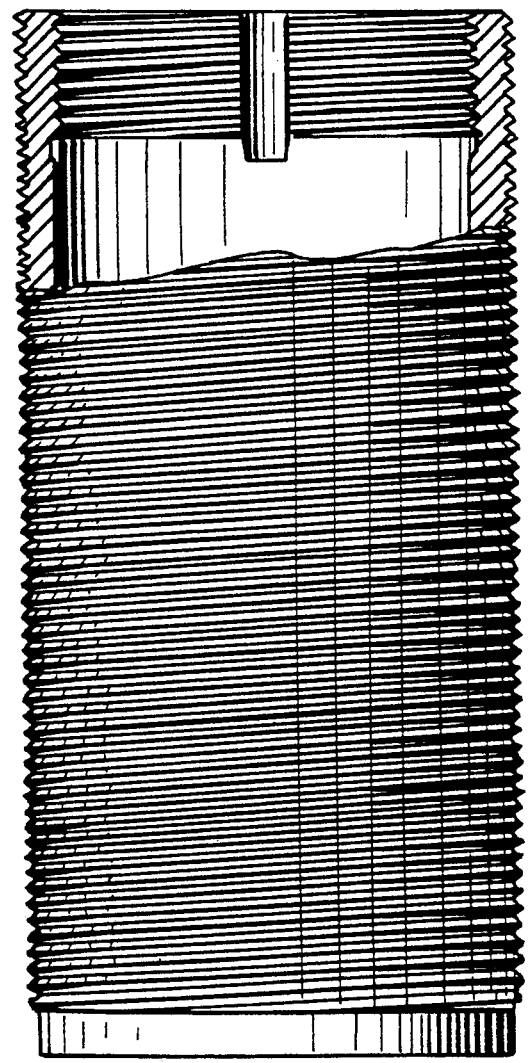
Figure 18:
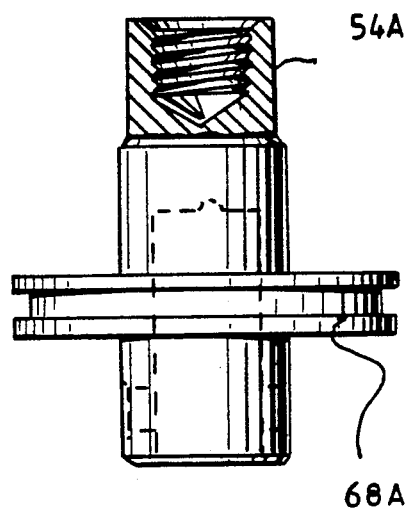
FIGS. 18 and 18A are close-up side and top views of the upper sealing flange and spindle portion associated therewith, as shown in FIG. 11.
Figure 18A:
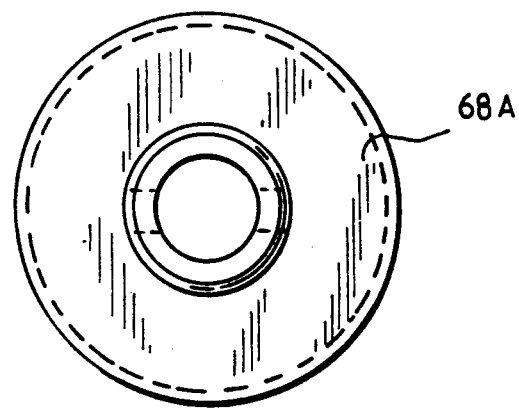
Figure 19:
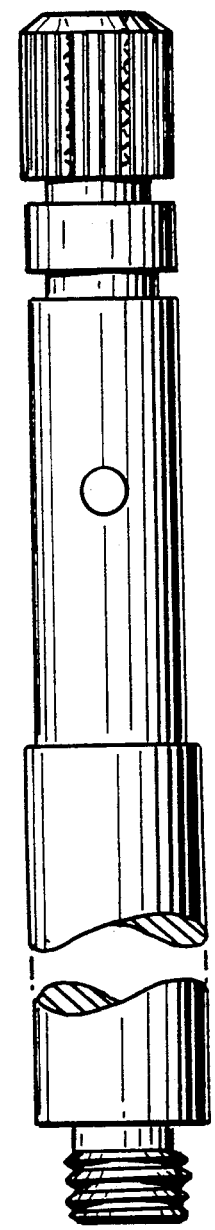
FIG. 19 is a close-up side view of portions of the spindle as shown in FIG. 11.

It is noted also as shown in FIG. 11 holding member 60A of seal member 50A is indented with groove 62A within which pin 64A is movable relative to same. Pin 64A stops the downward movement of spindle holding member 60A, having internal wound spring means 66A to keep further constant pressure of seal member 50A against chamber base 24A. The spring is compressed below a sealing flange above the spindle holding member 60A. This is necessary to prevent a backwash of water from the outlet if there is an interruption of water source. The pin acts to hold the seal in place against the further interruptions of water which may cause the interruption of the sealing function of seal 50A against chamber base 24A.

Furthermore, in the embodiment shown in FIGS. 10-21, a means for locking spindle 54A in place is depicted, including detent plate 80A, fixed to the interior of housing 76A, and detent 82A, which rotates within bonnet 84A about spindle 54A. Detent plate 80A contains strategically placed indicating ridge 86A to which notches 88A, 88A' and 88A" situated along the bottom surface 89A of detent 82A are coupled. Notches 88A, etc. correspond to the locations of outlet ports 26A, 28A and 30A within chamber base 24A. By rotating detent 82A along a vertical axis, the various notches are moved to their respective positions above indicating ridge 86A of detent plate 80A, thereby opening the flow of water from port 52A within seat 50A to one of outlet ports 26A, 28A and 30A of chamber base 24A.

It is also noted that detent 82A also functions as a rotating bearing within bonnet 84A.

Although the details of the detent mechanism are shown in FIGS. 10-21, a similar version may be employed in the embodiment shown in FIGS. 1-7.

In short, the diverter valve as shown in FIGS. 10-21 operates in a similar manner to that shown in FIGS. 1-7. The horizontally oriented disk shaped seal 50A is placed snug against chamber base 24A and is rotated horizontally about a vertical axis by means of rotation of spindle connecting member 62A and spindle member 54A. When it is necessary to interrupt the flow of water, the spindle 54A is rotated so that the hole 52A of sealing member 50A is rotated away from communicating from either of outlet port holes 26A, 28A and 30A of chamber base 24A so as to also seal off the flow of water communicating therebetween. As a result, the sealing member 50A firmly abuts against the upper surface of chamber base 24A in a water tight manner.

The present invention is not limited to the details shown since various modifications and structural changes are possible without departing in any way from the spirit of the invention.

What is desired to be protected by Letters Patent is set forth in the appended claims.

1. A diverter valve, comprising a body having an inlet port and and outlet port for fluid to pass through, with said fluid entering said body through said inlet port, a seal member being contained within said body, said seal member having a hole for accepting said fluid entering said body through said inlet port of said body, a valve spindle being contained within said body and being biased to urge said seal member upon a base of said body, upon which said base said seal member is capable of being rotated; said seal member comprising a movable closure element further including openings for receiving said inlet water from said inlet port and a spindle for rotating said sealing member, a spring member being activated by an application of vertical force upon said seal member biased to said base of said body;

at least one outlet tube source connected to an intermediate outlet tube, said outlet source being communicated with an outlet port within said sealing member, said sealing member being rotatable in an open and closed position to permit a flow of fluid there through by rotating said sealing member, said sealing member being positioned within said body between said inlet port and said outlet port so as to direct said flow of fluid against a base of said body;

a resilient means for biasing said valve sealing member toward said base of said body;

said resilient means including a spring urging said sealing member against said base of said body.

2. The invention as in claim 1 wherein the inlet port includes a plurality of water inlet sources.

3. The invention as in claim 1 wherein said outlet port includes a plurality of outlet sources.

4. The invention as in claim 1 wherein said sealing member further includes an O-ring surrounding a circumference of said rotatable sealing member.

5. The diverter valve as in claim 1, further comprising a rotatable detent bearing rotating within a bonnet attached to said spindle, said detent communicating with a detent plate such that notches within said detent couple with an indicating ridge upon said detent plate, said notches corresponding to said outlet ports of said base of said body for communicating water therethrough.

6. The device as in claim 5, wherein said rotatable detent rotates as a bearing between said detent plate and said bonnet.

7. The diverter valve as in claim 1, wherein said spring is a circular spring around and surrounding said spindle of said sealing member, said spring urging said sealing member against said base of said body, said spring being compressed between said sealing member and a sealing flange.

* * * * *